United States Patent
Sugiura

(10) Patent No.: US 9,746,683 B2
(45) Date of Patent: Aug. 29, 2017

(54) AUTOMATIC SURVEY INSTRUMENT

(71) Applicant: TOPCON CORPORATION, Tokyo (JP)

(72) Inventor: Akinobu Sugiura, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 15/232,231

(22) Filed: Aug. 9, 2016

(65) Prior Publication Data
US 2017/0045748 A1    Feb. 16, 2017

(30) Foreign Application Priority Data
Aug. 12, 2015   (JP) .................. 2015-159331

(51) Int. Cl.
| | |
|---|---|
| G02B 27/14 | (2006.01) |
| G01C 1/02 | (2006.01) |
| G01C 15/00 | (2006.01) |
| G01S 3/786 | (2006.01) |
| G01S 7/481 | (2006.01) |
| G01S 17/08 | (2006.01) |
| G02B 5/22 | (2006.01) |

(52) U.S. Cl.
CPC ............. *G02B 27/141* (2013.01); *G01C 1/02* (2013.01); *G01C 15/002* (2013.01); *G01S 3/786* (2013.01); *G01S 7/4811* (2013.01); *G01S 17/08* (2013.01); *G02B 5/22* (2013.01); *G02B 27/145* (2013.01)

(58) Field of Classification Search
CPC ...... G02B 27/141; G02B 5/22; G02B 27/145; G01C 1/02; G01C 15/002; G01S 3/786; G01S 7/4811; G01S 17/08
USPC ........ 359/629, 634, 638, 641; 356/4.01, 375
See application file for complete search history.

(56) References Cited

U.S. PATENT DOCUMENTS 6,222,678 B1 *  4/2001  Kimura .................... G01C 1/02
                                                     250/203.2

FOREIGN PATENT DOCUMENTS

JP          4023572 B2     12/2007

\* cited by examiner

*Primary Examiner* — William Choi
(74) *Attorney, Agent, or Firm* — Roberts Mlotkowski Safran Cole & Calderon P.C.

(57) ABSTRACT

In an automatic survey instrument that divides reflected light from a target into collimation light, range-finding light, and tracking light, a configuration of an optical absorption filter for visible light absorption to be used for SN ratio improvement is simplified, and deterioration in automatic tracking performance due to a defect inside the optical absorption filter is suppressed. Between two prisms (41, 43) defining a second reflecting surface (45) of a dichroic prism (40) through which reflected light from a target enters, an optical absorption filter (46) that absorbs a wavelength band of visible light is inserted, and the second reflecting surface (45) is formed at a border between a rear surface of the optical absorption filter (46) with respect to a light propagation direction and a surface of the prism (43) on the rear side of the optical absorption filter in the light propagation direction.

5 Claims, 4 Drawing Sheets

AUTOMATIC SURVEY INSTRUMENT

TECHNICAL FIELD

The present invention relates to an automatic survey instrument that automatically tracks a target, and particularly, to an automatic survey instrument including an optical system that divides reflection light from a target into collimation light, range-finding light, and tracking light.

BACKGROUND ART

An automatic survey instrument that automatically tracks a target emits light including different wavelength bands from a telescope, receives the reflected light from the target, and divides the reflected light into collimation light for collimation on the target with the naked eye, range-finding light for measurement of a distance to the target, and tracking light for automatic tracking by detecting a position of the target. As a wavelength dividing means, a dichroic prism is used in many cases. The telescope includes the dichroic prism, a telescopic optical system, a range-finding light emitting optical system, a range-finding light receiving optical system, a tracking light emitting optical system, and a tracking light receiving optical system.

FIG. 4 shows, as an example of the above-described automatic survey instrument, a configuration diagram of a dichroic prism and an optical system around the dichroic system inside a telescope described in Patent Literature 1. The reference sign 20 denotes a dichroic prism, wedged prisms 22 and 23 are attached to opposite surfaces of a pentagonal prism 21, and at borders between the prisms 21 and 22 and between the prisms 21 and 23, a first dichroic mirror surface 24 and a second dichroic mirror surface 25 are respectively formed.

Reflected light from a target passes through an objective lens 5 on an optical axis O and enters through the dichroic prism 20. The first dichroic mirror surface 24 transmits wavelengths of 400 nm-650 nm of the reflected light, and reflects wavelengths of 650 nm-850 nm. The second dichroic mirror surface 25 transmits wavelengths of 720-850 nm of infrared light, and reflects wavelengths of 650-720 nm. With this dichroic prism 20, reflected light from a target is divided into collimation light L1 (400 nm-650 nm), range-finding light L2 (800 nm), and tracking light (650 nm), and the collimation light L1 is guided to a telescopic optical system such as a focusing lens 6, an erect prism 7, a focus mirror 8, and an eyepiece lens 9, the range-finding light L2 is guided to a range-finding light receiving optical system such as a range-finding light receiving sensor 10, and the tracking light L3 is guided to a tracking light receiving optical system such as a tracking light receiving sensor 11.

Here, in an actual optical system, as shown in FIG. 4, for SN ratio improvement, an optical absorption filter 27 and an optical absorption filter 28 which absorb visible light are added to range-finding light and tracking light output surfaces although these are not shown in the drawings of Patent Literature 1. This is because, although the visible light is divided by the first dichroic mirror surface 24, it is difficult to completely divide all wavelength bands of visible light.

CITATION LIST

Patent Literature

[Patent Literature 1] Japanese Patent No. 4023572

SUMMARY OF THE INVENTION

Problem to be Solved by the Invention

In the automatic survey instrument shown in FIG. 4 described above, for the divided range-finding light L2 and tracking light L3 after passing through the dichroic prism 20, the optical absorption filters 27 and 28 are inserted. Therefore, two optical absorption filters having the same function to absorb visible light are used for range-finding and tracking, and this causes a problem which increases the number of components and makes the configuration complicated.

Moreover, since the optical absorption filters 27 and 28 are inserted after passage through the dichroic prism 20, particularly, when the tracking light is convergent light, the tracking light flux diameter that passes through the optical absorption filter 28 installed near the tracking light receiving sensor 11 becomes narrower. Therefore, even if a slight defect such as a bubble or stria exists inside the optical absorption filter 28, the ratio of the defect size to the light flux diameter is large, this causes a problem in which the light receiving quantity decreases or light quantity distribution of received light image is biased, and this leads to deterioration in target tracking performance.

Further, in a case where a defect size inside the optical absorption filter 28 is less than a visually recognizable size while satisfying a securing of tracking performance, inspection equipment such as a microscope is needed. In a case where the tracking light is invisible light, a defect inside the optical absorption filter 28 cannot be checked with the naked eye, and exclusive inspection equipment using a camera is needed.

In order to solve the above-described problems, an object of the present invention is, in an automatic survey instrument that divides reflected light from a target into collimation light, range-finding light, and tracking light, to simplify a configuration of an optical absorption filter for visible light absorption to be used for SN ratio improvement, and suppress deterioration of automatic tracking performance due to a defect inside the optical absorption filter.

Means for Solving the Problems

In order to attain the object, an automatic survey instrument according to an aspect of the present invention includes a dichroic prism through which reflected light from a target enters, a first reflecting surface that is provided on the dichroic prism and divides collimation light from the reflected light, and a second reflecting surface that is provided on the dichroic prism and divides light reflected by the first reflecting surface into range-finding light and tracking light, wherein between two prisms defining the second reflecting surface, an optical absorption filter that absorbs a wavelength band of visible light is inserted, and the second reflecting surface is formed at a border between a rear surface of the optical absorption filter with respect to a light propagation direction and a surface of the prism on the rear side of the optical absorption filter in the light propagation direction.

In the above-described aspect, preferably, the dichroic prism is disposed at the rear of an objective lens, and the reflected light that enters through the dichroic prism becomes convergent light.

In the above-described aspect, preferably, the range-finding light and the tracking light are light with long wavelengths of 600 nm or more, the first reflecting surface transmits light with a wavelength of 400-660 nm and reflects light with a wavelength of 660-1000 nm, the second reflecting surface transmits light with a wavelength of 660-700 nm and reflects light with a wavelength of 700-1000 nm, and the optical absorption filter absorbs light with a wavelength shorter than 660 nm.

In the above-described aspect, preferably, a thickness "d" in the light propagation direction of the optical absorption filter is 0 mm<d≤3.5 mm.

In the above-described aspect, preferably, on an output surface for the range-finding light and an output surface for the tracking light of the dichroic prism, optical thin films that respectively transmit only wavelengths of the range-finding light and the tracking light, are formed.

Effects of the Invention

According to the present invention, range-finding light and tracking light share one optical absorption filter, so that the number of components can be reduced and the configuration can be simplified.

In addition, since the optical absorption filter is inserted inside the dichroic prism, the distance between the optical absorption filter and the tracking light receiving sensor becomes longer, and a tracking light flux that passes through the optical absorption filter becomes larger than conventionally. Accordingly, the ratio of a defect size of the optical absorption filter to the light flux diameter becomes smaller, and as a result, deterioration in target tracking performance can be suppressed.

Further, a defect size inside the optical absorption filter, allowable in terms of securing of tracking performance, is relaxed, and accordingly, the yield of components is improved, and exclusive inspection equipment using a microscope, etc., can be made unnecessary or relaxed.

BEST MODE FOR CARRYING OUT THE INVENTION

Next, a preferred embodiment of the present invention is described with reference to the drawings.

FIG. 1 is an external view of an automatic survey instrument to which the embodiment is applied. This automatic survey instrument includes a leveling portion 1, a base portion 2 provided on the leveling portion 1, a bracket portion 3 provided horizontally rotatable around a vertical axis on the base portion 2, and a telescope 4 provided vertically rotatable around a horizontal axis provided in the bracket portion 3. The bracket portion 3 and the telescope 4 are driven to rotate by a built-in motor (not shown), and can be remotely or automatically operated.

Light emitted from the telescope 4 includes different wavelength bands for collimation, range-finding, and tracking. Reflected light from a target is made incident on a dichroic prism 40 described later, and wavelength-divided by purpose into collimation light, range-finding light, and tracking light, and accordingly, collimation, range-finding, and automatic tracking of the target are performed.

FIG. 2 is a configuration diagram of the dichroic prism 40 according to the embodiment. In FIG. 2, the same component as in FIG. 4 is designated by the same reference sign and the description thereof is omitted. On an optical axis O of the received reflected light, the objective lens 5, the dichroic prism 40, the focusing lens 6, the erect prism 7, the focus mirror 8, and the eyepiece lens 9 are disposed in this order.

The dichroic prism 40 is formed by disposing second and third prisms 42 and 43 each having a wedged shape on opposite surfaces of a pentagonal first prism 41. At a border between the first prism 41 and the second prism 42, a first dichroic mirror surface 44 is formed by thin-film coating on the surface of the second prism 42. Between the first prism 41 and the third prism 43, an optical absorption filter 46 that absorbs visible light is inserted by bonding. A second dichroic mirror surface 45 is formed by thin-film coating on the surface of the third prism 43 facing the optical absorption filter 46, and formed at a border between a rear surface of the optical absorption filter 46 and a surface of the third prism 43.

The first dichroic mirror surface 44 transmits light with a wavelength of 400 nm-660 nm and reflects light with a wavelength of 660 nm-1000 nm. The second dichroic mirror surface 45 transmits light with a wavelength of 660 nm-700 nm and reflects light with a wavelength of 700 nm-1000 nm. In this specification, "-" is used as a sign including border values. On the other hand, in the present embodiment, it is preferable that collimation light with a wavelength $\lambda 1$ is visible light satisfying 400 nm≤$\lambda 1$<600 nm, the range-finding light with a wavelength $\lambda 2$ is visible light satisfying 660 nm≤$\lambda 2$<700 nm, and the tracking light with a wavelength $\lambda 3$ is infrared light satisfying 850 nm≤$\lambda 3$≤1000 nm. The reason for this is described later. On the other hand, it is preferable that the optical absorption filter 46 absorbs light with a wavelength shorter than the wavelength of 660 nm.

Near an output surface of the third prism 43, a range-finding light receiving sensor 10 is disposed on an optical axis of reflected light of the first dichroic mirror surface 44. Near an output surface of the first prism 41, a tracking light receiving sensor 11 is disposed on an optical axis of reflected light of the second dichroic mirror surface 45.

On the output surface of the third prism 43, a bandpass filter 47 that transmits only the wavelength of the range-finding light is formed by coating. Near the output surface of the first prism 41, a bandpass filter 48 that transmits only the wavelength of the tracking light is preferably formed by coating.

Hereinafter, effect is described.

When reflected light from a target enters from the objective lens 5, the first dichroic mirror surface 44 reflects range-finding light and tracking light and transmits collimation light L1. An image of the transmitted collimation light L1 is formed on the focus mirror 8 by the focusing lens 6, and the formed image is formed on the retina of a surveyor together with a scale of the focus mirror 8.

The range-finding light and the tracking light reflected by the first dichroic mirror surface 44 advances in coaxial propagation light paths, and are transmitted through the optical absorption filter 46 inserted before the second dichroic mirror surface 45, and light with a wavelength shorter than 660 nm is absorbed herein. The range-finding light L2 is transmitted through the second dichroic mirror surface 45 after being transmitted through the optical absorption filter 46, and then guided to the range-finding light receiving sensor 10. The tracking light L3 is transmitted through the optical absorption filter 46 and then reflected by the second dichroic mirror surface 45, and transmitted through the optical absorption filter 46 again and guided to the tracking light receiving sensor 11.

According to the present embodiment, the range-finding light L2 and the tracking light L3 reflected by the first dichroic mirror surface 44 pass through the optical absorption filter 46 before the second dichroic mirror surface 45 in the propagation light paths, and are then divided by the second dichroic mirror surface 45 and output. Accordingly, the optical absorption filters 27 and 28 conventionally provided separately for range-finding and tracking in the configuration shown in FIG. 4 are eliminated, and one optical absorption filter 46 is shared for range-finding and tracking, so that the number of components can be reduced and the configuration can be simplified.

In addition, since the optical absorption filter 46 is inserted inside the dichroic prism 40 (between the first prism 41 and the third prism 43), in the tracking light path of the tracking light L3 reflected by the second dichroic mirror surface 45, the distance between the optical absorption filter 46 and the tracking light receiving sensor 11 becomes longer. The reflected light from the target passes through the objective lens 5 and becomes convergent light, so that the tracking light flux that passes through the optical absorption filter 46 becomes larger than the conventional one (FIG. 4). Accordingly, even if the optical absorption filter 46 has a defect inside, the ratio of the defect size to the light flux diameter becomes smaller, and as a result, a decrease in light receiving quantity and bias of light quantity distribution of the received light image in the tracking light receiving sensor 11 are reduced, and the SN ratio of the tracking light receiving sensor 11 is improved to be higher than conventionally, and deterioration in target tracking performance can be suppressed. In the present embodiment, obtaining an attenuation effect squared by transmitting the tracking light L3 through the optical absorption filter 46 twice is also advantageous for improvement in SN ratio of the tracking light receiving sensor 11.

In addition, as described above, by distancing the optical absorption filter 46 from the tracking light receiving sensor 11, a defect size inside the optical absorption filter 46, allowable in terms of securing of tracking performance, is relaxed. Accordingly, the yield of components of the optical absorption filter is improved, and the exclusive inspection equipment using a microscope, etc., can be made unnecessary or relaxed.

As described above, according to improvement in SN ratio of the tracking light receiving sensor 11, the wavelength characteristics of the first dichroic mirror surface 44, the second dichroic mirror surface 45, the collimation light, the range-finding light, and the tracking light can be changed to values more advantageous than conventional values.

The transmitting region of the first dichroic mirror surface 44 is widened from the conventional transmitting region of 400 nm-650 nm to the region of 400 nm-660 nm. On the other hand, setting of the wavelength λ1 of the collimation light is changed from the conventional 400 nm≤λ1≤650 nm to 400 nm≤λ1<660 nm. That is, by enlarging the transmitting region of the first dichroic mirror surface 44 to be larger to the red side than conventionally, red-side wavelengths increase in the collimation light L1 obtained through the eyepiece lens 9, and accordingly, red color development is improved. Accordingly, an image of collimation becomes more natural hue than conventionally.

Regarding the second dichroic mirror surface 45, the transmitting region thereof is changed from the conventional region of 720 nm-850 nm to a region of 660 nm-700 nm, and the reflecting region is changed from the conventional region of 650 nm-720 nm to a region of 700 nm-1000 nm. On the other hand, the setting of the wavelength λ2 of the range-finding light is changed from the conventional 800 nm to 660 nm≤λ2<700 nm, and the setting of the wavelength λ3 of the tracking light is changed from the conventional 650 nm to 850 nm≤λ3≤1000 nm. That is, regarding the range-finding light, since the wavelength band thereof is changed from invisible light to visible light less than 700 nm, safety measures according to a laser safety standard can be relaxed and applicable products can be increased. Regarding the tracking light, since it is changed from visible light to invisible light, its transmitting region is enlarged to the infrared light side, so that the SN ratio of the tracking light receiving sensor 11 can be further improved. The biggest disturbance (noise) for the tracking light receiving sensor 11 is sunlight, and intensity distribution (spectrum) by wavelength of sunlight has a peak near the wavelength of 500 nm, and from this wavelength, as the wavelength becomes longer, the intensity decreases. Therefore, when the wavelength λ3 of the tracking light in the present embodiment is (850 nm≤λ3≤1000), this is longer than the wavelength of 650 nm of the conventional tracking light, and sunlight intensity that becomes noise decreases, and the SN ratio is improved. Further, the longer the wavelength, the higher the infrared light laser power allowable in the same laser safety class, so that the signal intensity can be increased as compared with the conventional tracking light, and accordingly, the SN ratio can be further improved.

The thickness "d" (refer to FIG. 2) of the optical absorption filter 46 is preferably made thicker from the viewpoint of improvement in SN ratio of the range-finding light receiving sensor 10 and the tracking light receiving sensor 11, and preferably made thinner for keeping the prism strength from the viewpoint that the optical absorption filter is bonded between the first prism 41 and the third prism 43. In order to satisfy these contradictory conditions, the thickness "d" of the optical absorption filter 46 is preferably set to 0 mm<d≤3.5 mm, and particularly, to approximately 3.0 mm.

Next, FIG. 3 is a configuration diagram showing a modification of the dichroic prism 40 shown in FIG. 2. In FIG. 3, the same component as shown in FIG. 2 is designated by the same reference sign and the description thereof is omitted.

In the dichroic prism 40 as the modification, the first prism 41, the second prism 42, and the third prism 43 are formed of triangular prisms. The first dichroic mirror surface 44 is formed at a border between the first prism 41 and the third prism 43. Between the first prism 41 and the second prism 42, an optical absorption filter 46 is inserted by bonding, and the second dichroic mirror surface 45 is formed by thin-film coating on a surface of the second prism 42 facing the optical absorption filter 46.

The second dichroic mirror surface 45 is formed to transmit a wavelength of 700-1000 nm and reflect a wavelength of 660-700 nm, that is, unlike the configuration shown in FIG. 2, the tracking light L3 is transmitted and the range-finding light L2 is reflected. On the output surface of the first prism 41, a bandpass filter 47 that transmits only the wavelength of the range-finding light is formed by coating. Near the output surface of the second prism 42, a bandpass filter 48 that transmits only the wavelength of the tracking light is formed by coating.

In this modification, the second dichroic mirror surface 45 is also formed at a border between a rear surface in the light propagation direction of the optical absorption filter 46 and a surface of the second prism 42 on the rear side of the optical absorption filter 46 in the light propagation direction, so that an effect equivalent to that of the configuration shown in FIG. 2 is obtained.

Thus, by inserting the optical absorption filter between two prisms defining the second reflecting surface, and forming the second reflecting surface at a border between a rear surface in a light propagation direction of the optical absorption filter and a surface of the prism on the rear side of the optical absorption filter in the light propagation direction, even with a dichroic prism having another shape, the same effect as in the embodiment can be obtained.

In the configuration shown in FIG. 2 and FIG. 3, the tracking light L3 is output upward in the drawing, and as long as other optical systems and mechanical systems are allowed to be disposed inside the telescope 4, the configuration may be appropriately changed so that the range-finding light L2 is output upward.

Although a preferred embodiment of the present invention is described above, and the above-described embodiment and modification are just examples of the present invention, and a person skilled in the art can combine these based on his/her knowledge, and such a combined mode is also included in the scope of the present invention.

DESCRIPTION OF SYMBOLS

Figure 1:
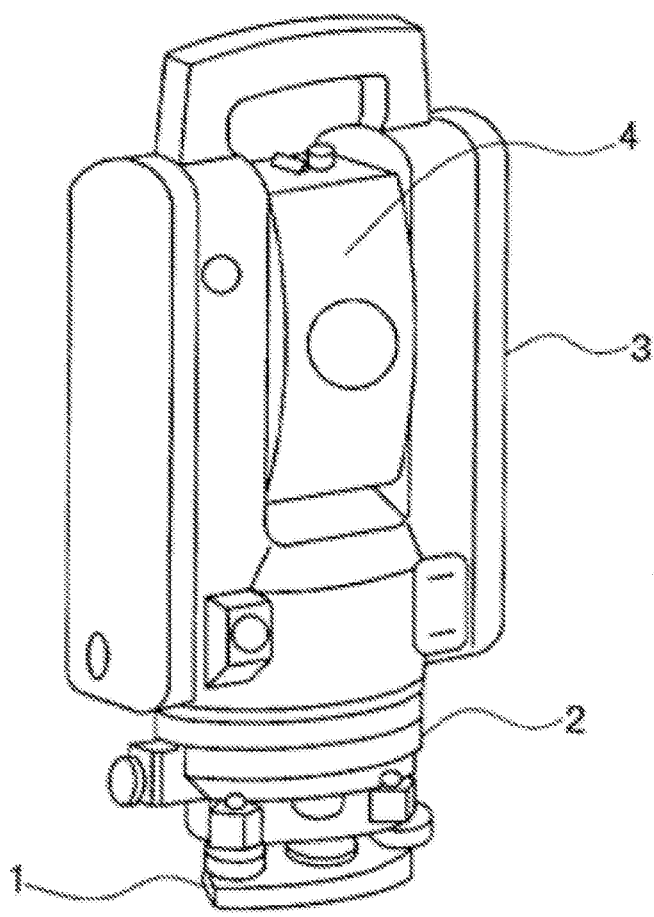
FIG. 1 is an external view of an automatic survey instrument to which an embodiment is applied.
Figure 2:
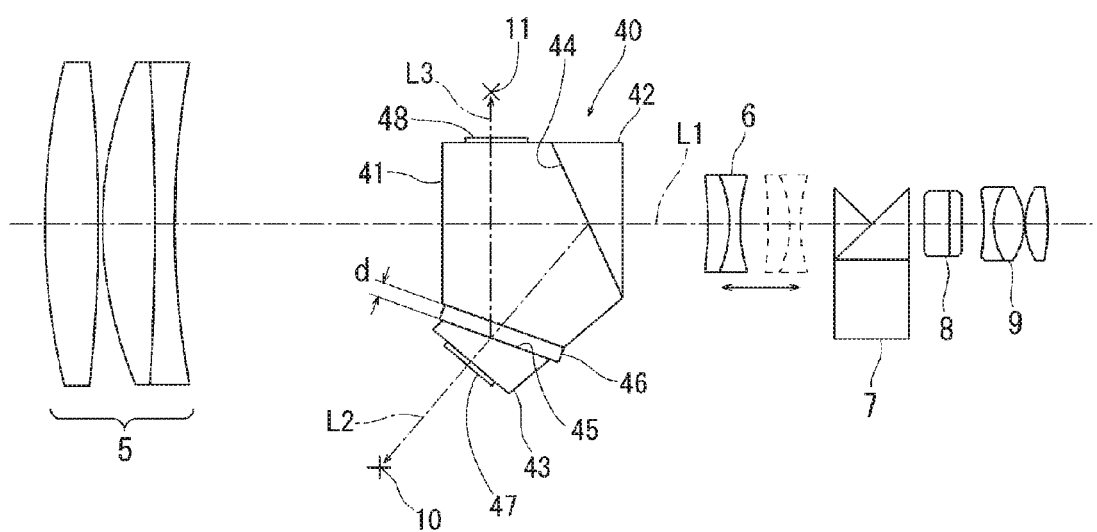
FIG. 2 is a configuration diagram of a dichroic prism according to the embodiment.
Figure 3:
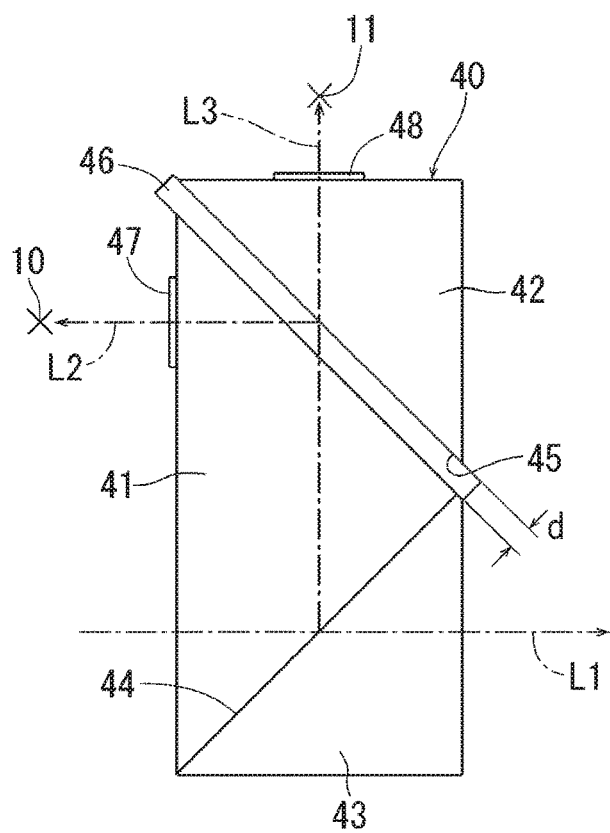
FIG. 3 is a configuration diagram showing a modification of the dichroic prism shown in FIG. 2.
Figure 4:
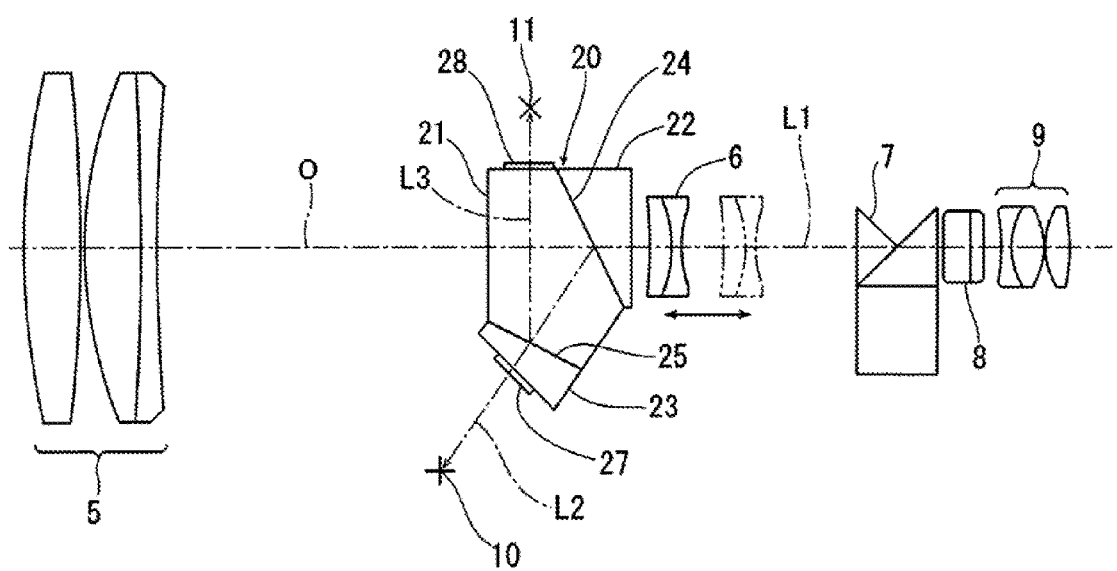
FIG. 4 is a configuration diagram of a conventional dichroic prism.

5 Objective lens
10 Range-finding light receiving sensor
11 Tracking light receiving sensor
40 Dichroic prism
41 First prism
42 Second prism
43 Third prism
44 First dichroic mirror surface (first reflecting surface)
45 Second dichroic mirror surface (second reflecting surface)
46 Optical absorption filter
47 Bandpass filter (optical thin film)
48 Bandpass filter (optical thin film)

The invention claimed is:

1. An automatic survey instrument comprising:
    a dichroic prism through which reflected light from a target enters;
    a first reflecting surface that is provided on the dichroic prism and divides collimation light from the reflected light; and
    a second reflecting surface that is provided on the dichroic prism and divides light reflected by the first reflecting surface into range-finding light and tracking light, wherein
        between two prisms defining the second reflecting surface, an optical absorption filter that absorbs a wavelength band of visible light is inserted, and
        the second reflecting surface is formed at a border between a rear surface of the optical absorption filter with respect to a light propagation direction and a surface of the prism on the rear side of the optical absorption filter in the light propagation direction.
2. The automatic survey instrument according to claim 1, wherein the dichroic prism is disposed at the rear of an objective lens, and the reflected light that enters through the dichroic prism becomes convergent light.
3. The automatic survey instrument according to claim 1, wherein the range-finding light and the tracking light are light with long wavelengths of 660 nm or more, the first reflecting surface transmits light with a wavelength of 400 - 660 nm and reflects light with a wavelength of 660-1000 nm, the second reflecting surface transmits light with a wavelength of 660-700 nm and reflects light with a wavelength of 700-1000 nm, and the optical absorption filter absorbs light with a wavelength shorter than 660 nm.
4. The automatic survey instrument according to claim 1, wherein a thickness "d" in the light propagation direction of the optical absorption filter is 0 mm $<d\leq3.5$ mm.
5. The automatic survey instrument according to claim 1, wherein on an output surface for the range-finding light and an output surface for the tracking light of the dichroic prism, optical thin films that respectively transmit only wavelengths of the range-finding light and the tracking light, are formed.

* * * * *